Dec. 25, 1962 F. SOMMER 3,069,761
PUSHING AND PULLING DEVICES
Filed July 14, 1959
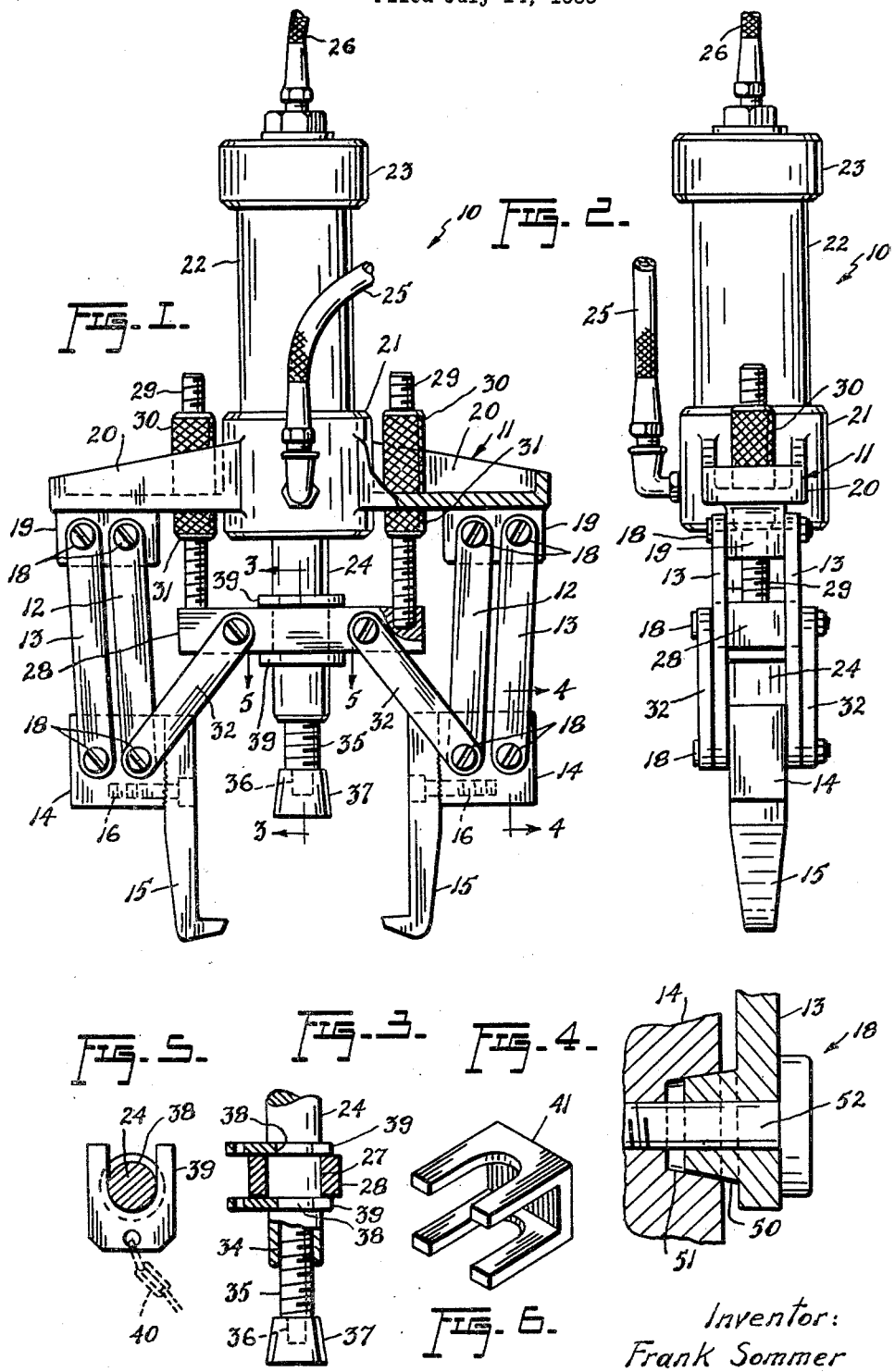
Inventor:
Frank Sommer United States Patent Office
3,069,761
Patented Dec. 25, 1962

3,069,761
PUSHING AND PULLING DEVICES
Frank Sommer, 203 Main St. S., Winnipeg,
Manitoba, Canada
Filed July 14, 1959, Ser. No. 827,038
5 Claims. (Cl. 29—252)

This invention relates to new and useful improvements in pulling devices or pullers, and in particular the invention concerns itself with devices of the general type disclosed in my co-pending patent application Serial No. 613,576, filed October 2, 1956, of which this application is a continuation-in-part. Since the filing of this application, my earlier application has matured into United States Patent No. 2,902,751, dated September 8, 1959.

In my aforesaid earlier application there is disclosed a pulling device having work engaging jaws carried by blocks which are connected by pivoted links to a cross head so that the jaws may be moved toward and away from each other for operative engagement or disengagement with the work, together with manually operable screw-actuated means on the cross head for moving the blocks as above outlined, and additional manually operable screw-actuated means also carried by the cross head for engaging a component of a piece of work gripped by the jaws and exerting a pressing force on such a component whereby to push the same relative to other components of the work, or in another sense, to pull such other components relative to the first mentioned component so as to, in either event, effect a step of assembly or disassembly, as the situation may require, in the particular item of work involved.

The principal object of the present invention is to materially improve the efficiency and ease of operation of my earlier invention, this object being attained by the provision of a fluid operator in place of the manually operable screw-actuated means for exerting a pulling or a pushing force on one component in relation to other components of a piece of work, the embodiment of such a fluid operator not only permitting the required operation to be performed with ease, simplicity and convenience, but also facilitating a steady, continuous and uniform application of the pulling or pushing force which is desirable for efficient assembly or disassembly purposes in preference to a spontaneous, intermittent and irregular force application such as is exerted by a manually operated screw.

Another important object of the invention resides in the provision of means for structurally and functionally connecting the work engaging jaws of the device with the force exerting fluid operator whereby the latter may be utilized, apart from its force exerting function, to move the jaws into a firm and positive engagement with the work so that the work does not shift or slip from the jaws when the force is subsequently applied, means also being provided for locking the jaws to the work after they have been brought into a firm engagement therewith by the fluid operator, so that the latter may be released from its jaw actuating function and utilized for exertion of force, as already mentioned.

Another important object of the present invention resides in the provision of improved pivot joints between the aforementioned links, blocks and cross head, wherein the effective bearing area or surface of such pivot joints is materially increased in order to minimize wear and the tendency of the various parts to become misaligned, particularly under the stress of the working force involved when the device is in operation.

Some of the advantages of the invention reside in its simplicity of construction, efficient and dependable operation, in its durability, and in its adaptability to convenient and economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a front elevational view of a force applicator in accordance with the present invention;

FIGURE 2 is a side elevational view thereof;

FIGURE 3 is a fragmentary sectional view, taken substantially in the plane of the line 3—3 in FIGURE 1;

FIGURE 4 is a sectional detail on an enlarged scale, taken substantially in the plane of the line 4—4 in FIGURE 1;

FIGURE 5 is a sectional detail on an enlarged scale, taken substantially in the plane of the line 5—5 in FIGURE 1; and FIGURE 6 is an isometric view showing a modified embodiment of the locking key such as may be used in the invention.

Referring now to the accompanying drawings in detail, the force applicator or pushing and pulling device in accordance with the invention is designated generally by the reference numeral 10 and, to some extent, is similar in construction to the device disclosed in my aforementioned application Serial No. 613,576, insofar that it embodies a cross head 11 having pivotally connected thereto pairs of parallel inner and outer links 12, 13, respectively, which in turn are pivotally connected to a pair of blocks 14 provided with a pair of work engaging jaws 15. It will be understood, of course, that the jaws 15, wich are removably attached to the blocks 14 by suitable bolts or screws 16, are suitably shaped to engage a particular piece of work either externally when the blocks 14 are drawn together, or internally when the blocks are spread apart, and it will be also understood that the jaws are interchangeable so that jaws of a particular configuration may be applied to the blocks so as to suit a particular piece of work, as required.

The lower ends of the links 12, 13 are pivotally attached to the blocks 14 by pivot means designated generally by the reference numeral 18 hereinafter more fully described, and similar pivot means, also designated 18, are employed for pivotally connecting the upper ends of these links to depending ears or lugs 19 which are provided at the underside of the opposite end portions of the cross head 11. These end portions of the cross head, indicated at 20, are substantially U-shaped in cross-section and are formed integrally with, welded or otherwise secured to a cylindrical center portion 21 of the cross head, which center portion is in the shape of a cup or socket and also constitutes the lower end of a fluid operator such as an air cylinder or a hydraulic cylinder 22 equipped with a cap 23 at its upper end, as shown.

The cylinder 22 contains a reciprocable piston (not shown) having a piston rod 24 projecting downwardly through the cross head portion 21 and suitable flexible hoses 25, 26 are connected to the portion 21 and to the end cap 23, respectively, for admitting fluid under pressure to the cylinder in the conventional well known manner, so that the cylinder is double-acting and capable of sliding the piston rod 24 either upwardly or downwardly, as desired.

The downwardly projecting portion of the piston rod 24 extends slidably through a bore 27 formed in a cross bar 28 which is disposed below the cross head 11 and is provided at the ends thereof with a pair of screw-threaded, upwardly projecting studs 29, the latter extending through suitable apertures formed in the cross head portions 20 and being equipped with knurled lock nuts 30, 31, above and below the cross head, respectively.

Pairs of connecting links 32 are pivoted to the cross bar 28 by the pivot means 18 already mentioned, and are also pivoted to the blocks 14 by the pivot means 18 at the lower ends of the links 12, as will be readily apparent.

The lower end portion of the piston rod 24 projecting through the cross bar 28 is provided with a screw-threaded axial bore 34 receiving therein a screw-threaded extension shaft 35 which, in turn, is provided at its lower end with a diametrically reduced portion 36 having a removable work engaging pad 37 positioned thereon, the pad 37 being configurated so as to suit a particular piece of work in cooperation with the work engaging jaws 15. Also, as is best shown in FIGURE 3, the portions of the piston rod 24 immediately above and below the cross bar 28 are formed with annular grooves 38 which removably receive therein a pair of horseshoe-shaped keepers or locking keys 39, best shown in FIGURE 5. The keys 39 are connected by suitable chains or other fastening elements 40 to the body of the device, so that they do not become misplaced when they are not in use, that is, when they are not placed in the grooves 38 of the piston rod 24. Depending upon the direction of force applied by the cylinder 22, the locking keys 39 may be used singly, either above or below the cross bar 28. Alternatively, a unitary locking key or keeper 41 shown in FIGURE 6 may be employed for simultaneous engagement with both of the grooves 38 in the piston rod 24, if so preferred.

Having thus far described the construction of the invention, its manner of operation will now be explained.

With the device arranged as shown in FIGURE 1, the lock nuts 30, 31 on the studs 29 may be loosened sufficiently to facilitate upward and downward sliding of these studs through the cross head portions 20 and, with the keepers 39 (or 41) in place on the piston rod 24, the cylinder 22 may be energized so as to cause the piston rod 24 to be slid upwardly, for example, thus causing the cross bar 28 and the links 32 to draw the blocks 14 and the jaws 15 together and bringing the jaws into a firm, positive engagement with a piece of work, such as a gear on an axle, for example, positioned between the jaws. When this firm engagement of the jaws with the work is attained, the lock nuts 30, 31 are tightened against the cross head in order to preserve the firm engagement of the jaws with the work which has been effected by actuation of the cylinder 22, and thereupon, the keepers 39 are removed from the grooves 38 in the piston rod 24 and the cylinder 22 is energized to slide the piston rod downwardly, thus bringing the pad 37 in contact with the work, in the instance given, with the axle on which the gear is mounted, so that the axle is pushed out of the gear or, expressed in another way, so that the gear is pulled off the axle. Obviously, the same procedure is applicable to removal of shaft bearings, as well as numerous other assembly and disassembly operations.

It will be also apparent that while the teachings of the present invention have been applied to a force applicator employing the parallel links 12, 13, the invention is also applicable to other similar devices wherein only the links 12 (or 13) are employed, the essence of novelty residing in the operative connection between the reciprocable rod 24 and the blocks 14 which support the work engaging jaws 15, so that, on one hand, the jaws may be brought into a positive engagement with the work by actuation of the rod 24, then locked in such an engagement by the means 29, 30, 31, and then so that upon removal of the keepers 39 (or 41) that the rod 24 may be actuated to perform its force exerting function.

With specific reference now to the pivot means 18 already mentioned, it will be appreciated that while ordinary bolts, pins, et cetera may be used for this purpose, it is desirable to minimize as much as possible the strain, friction and wear which takes place at these various pivots. The present invention takes cognizance of this situation by the provision of the pivot means 18 shown in detail in FIGURE 4 which illustrates the particular arrangement of the pivot connection of the lower end of the link 13 and the block 14, but is equally applicable to the pivots of the links 12, 13 to the cross head 11 as well as of the links 32 to the cross bar 28, the arrangement of FIGURE 4 being shown for illustrative purposes only. As such, the link 13 is provided with a frusto-conical boss 50 which is seated in a frusto-conical recess 51 formed in the block 14, while a suitable fastening element 52, such as a pin, bolt, screw, or the like, extends through the link 13 and boss 50 into the block 14. The function of the fastening element 52 is merely to hold the parts assembled, without the fastening element being subjected to any strain, friction, or wear at the pivot, all of such strain, friction and wear being absorbed by the interfitting contact of the boss 50 with the recess 51 which, in terms of contacting area, is much greater than that which would otherwise be afforded by the relatively smaller diameter of the fastening element 52 journalled in a simple aperture. Moreover, the "fit" of the pivotal action between the parts may be readily adjusted by simply loosening or tightening the element 52 so as to bring the boss 50 into a looser or a tighter engagement with the recess 51, so that is, after some time of operation, the pivot joint becomes somewhat worn, it may be easily re-adjusted to its normal operation by simply tightening the fastening element 52.

While in the foregoing there has been shown and described the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claims.

What is claimed as new is:

1. In a pushing and pulling device, the combination of a fluid operator including a reciprocable piston rod, a cross head provided on said fluid operator, a pair of links pivoted to said cross head at opposite sides of said piston rod, a pair of blocks connected to said links, a pair of work engaging jaws carried by said blocks, said piston rod being adapted to exert a force on work engaged by said jaws when said fluid operator is energized, and means connected to said blocks and releasably engageable with the piston rod for moving said blocks and said jaws in and out of the work engaging position, said means including an apertured member operatively connected to said blocks and having said piston rod slidable through the aperture thereof when the fluid operator is energized to exert a force on the work, and means separably engaging said piston rod and said apertured member to prevent sliding of the former relative to the latter and locking said apertured member to the piston rod for movement therewith when the fluid operator is not operative to exert a force on the work.

2. In a pushing and pulling device, the combination of a fluid operator including a cylinder and a reciprocable piston rod projecting from one end thereof, a cross head provided on said one end of said cylinder, pairs of links pivoted to said cross head and disposed at opposite sides of said piston rod, a pair of blocks connected to said links and movable toward and away from the piston rod, a pair of work engaging jaws carried by said blocks, means provided at the end of said piston rod for exerting a force on work engaged by said jaws when said fluid operator is energized, a pair of connecting links pivoted to said blocks and extending toward said piston rod, an apertured member pivoted to said connecting links and having said piston rod slidable through the aperture thereof when said fluid operator is energized to exert a force on the work by said means at the end of the piston rod, and means separably engaging said piston rod and said apertured member to prevent sliding of the former relative to the latter and locking said apertured member to the piston rod for movement therewith, whereby to move said jaws in and out of their work engaging position by energization of the fluid operator when the latter is not operative to exert force on the work by said means at the end of the piston rod.

3. The device as defined in claim 2 together with means carried by said apertured member and releasably engageable with said cross head for locking said jaws in their work engaging position.

4. The device as defined in claim 2 together with screw-threaded studs provided on said apertured member and extending slidably through apertures formed in said cross head, and lock nuts provided on said studs and abutting said cross head at least on the surface thereof remote from the apertured member, whereby to lock said jaws in their work engaging position.

5. The device as defined in claim 2 wherein said means for releasably locking said apertured member to said piston rod comprise horseshoe-shaped keepers removably positioned in annular grooves formed in said piston rod and abutting said apertured member.

References Cited in the file of this patent

UNITED STATES PATENTS

| | | |
|---|---|---|
| 1,534,350 | Bassett | Apr. 21, 1925 |
| 1,688,535 | Ellis et al. | Oct. 23, 1928 |
| 1,987,008 | Gunderson | Jan. 8, 1935 |
| 2,537,552 | Schlegel | Jan. 9, 1951 |
| 2,540,319 | Bitzer | Feb. 6, 1951 |
| 2,902,751 | Sommer | Sept. 8, 1959 |

FOREIGN PATENTS

| | | |
|---|---|---|
| 586,675 | France | Jan. 8, 1925 |